United States Patent
Dietrich (10) Patent No.: US 8,037,821 B2
(45) Date of Patent: Oct. 18, 2011

(54) METHODS AND APPARATUS FOR REDUCING THE TRANSMISSION OF MECHANICAL WAVES

(75) Inventor: Mark C. Dietrich, Oro Valley, AZ (US)

(73) Assignee: Raytheon Company, Waltham, MA (US)

(*) Notice: Subject to any disclaimer, the term of this patent is extended or adjusted under 35 U.S.C. 154(b) by 202 days.

(21) Appl. No.: 12/392,268

(22) Filed: Feb. 25, 2009

(65) Prior Publication Data

US 2009/0289400 A1 Nov. 26, 2009

Related U.S. Application Data

(60) Provisional application No. 61/047,654, filed on Apr. 24, 2008.

(51) Int. Cl.
*F42D 1/055* (2006.01)

(52) U.S. Cl. .......................... 102/200; 267/136; 248/560

(58) Field of Classification Search .................. 102/200; 267/136; 248/560

See application file for complete search history.

(56) References Cited

U.S. PATENT DOCUMENTS

| 5,360,236 A * | 11/1994 | Brown .......................... 248/672 |
| 6,578,682 B2 * | 6/2003 | Braman et al. ................ 188/378 |
| 7,404,324 B2 * | 7/2008 | Braman et al. .................. 73/493 |
| 7,665,708 B2 * | 2/2010 | Stothers et al. ............... 248/638 |
| 7,726,452 B2 * | 6/2010 | Kraner .......................... 188/378 |
| 2004/0150144 A1 * | 8/2004 | Goepfert et al. ............. 267/136 |
| 2007/0001354 A1 * | 1/2007 | Stothers et al. ............... 267/136 |
| 2009/0292396 A1 * | 11/2009 | Fox et al. ...................... 700/280 |

* cited by examiner

*Primary Examiner* — Michael Carone
*Assistant Examiner* — Samir Abdosh
(74) *Attorney, Agent, or Firm* — The Noblitt Group, PLLC (57) ABSTRACT

Methods and apparatus for reducing transmission of mechanical waves according to various aspects of the present invention comprise a set of isolators and a series of stops configured to isolate a piece of equipment in a projectile. The stops serve to limit the amount of stress loading placed on the isolators during transient events where loads associated with launch of the projectile or deployment of flight control surface might damage the isolators or cause the equipment to fail.

11 Claims, 7 Drawing Sheets

METHODS AND APPARATUS FOR REDUCING THE TRANSMISSION OF MECHANICAL WAVES

CROSS-REFERENCES TO RELATED APPLICATIONS

This application claims the benefit of U.S. Provisional Patent Application No. 61/047,654, filed Apr. 24, 2008, and incorporates the disclosure in its entirety by reference.

GOVERNMENT RIGHTS

This invention was made with Government support under Contract No. DAAE30-98-C-1032 with the United States Department of the Army. The Government of the United States of America has certain rights in this invention.

BACKGROUND OF INVENTION

Many systems and devices operate in an environment where mechanical waves propagate. These mechanical waves often take the form of vibrations, shock waves, pressure waves, sound waves, and the like. In some systems and devices these mechanical waves are intentionally caused by components of the system or device itself. In other systems and devices these mechanical waves are unintentionally or undesirably created by components of the system or device itself, sometimes as a by-product of otherwise useful processes. In still other systems and devices these mechanical waves are not caused by components of the system or device itself, but are nevertheless present in the environment in which the system or device operates. Regardless of how the mechanical waves are produced, there are often components of such systems and devices which are negatively affected by the waves. It is therefore often desirable to reduce the effects of such mechanical waves on certain components of the system or device.

Some previous efforts on reducing the effects of mechanical waves have focused on reducing or eliminating the mechanical waves at their source. For instance, in systems and devices where the mechanical waves are caused internally, efforts have been made to remove or replace the component or process that causes the mechanical waves. Another previous effort comprised adding additional vibration and shock requirements to the design specification of equipment subjected to mechanical waves during operation. This solution, however, increases the cost and complexity of the equipment. Likewise, in systems and devices that do not themselves produce mechanical waves but nevertheless operate in an environment where such are present, efforts have been made to alter the environment such that the mechanical waves are not produced in that environment. However, in some systems and devices it would be difficult, prohibitive, costly, or impossible to reduce or eliminate the source of the mechanical waves. Thus in many systems and devices the mechanical waves continue to negatively affect components.

For example, guided projectile systems often employ sophisticated computer-based guidance systems that are capable of detecting a laser or other target-designating signal. Upon detecting the target signal, the guidance system modifies control surfaces of the projectile to guide it towards the target. Often the guidance system further comprises an inertial measurements unit (IMU) that provides additional information relating to the projectile's orientation, trajectory, and velocity to the guidance system. Unfortunately, the performance of the IMU can be severely diminished during flight such as when a pyrotechnic event occurs to deploy the projectile's control surfaces. If the IMU begins to resonate in response to the pyrotechnic shock it may not be able to provide accurate data to the guidance system for a period of time and may result in diminished performance of the guidance system. Furthermore, the IMU undergoes significant stresses that result from the extreme acceleration that occurs during launch. Accordingly, there is a need for a vibration dampening device that can isolate an IMU or other sensitive component of a guided projectile both from the shock sustained during launch and during the various pyrotechnic events that may take place during the flight of the projectile.

SUMMARY OF THE INVENTION

Methods and apparatus for reducing transmission of mechanical waves according to various aspects of the present invention comprise a set of isolators and a series of stops configured to isolate a piece of equipment in a projectile. The stops serve to limit the amount of stress loading placed on the isolators during transient events where loads associated with launch of the projectile or deployment of flight control surface might damage the isolators or cause the equipment to fail.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present specification and accompanying drawings describe exemplary embodiments by way of illustration and best mode. While these exemplary embodiments are described, other embodiments may be realized, and changes may be made without departing from the spirit and scope of the invention. The detailed description is presented for purposes of illustration only and not of limitation. For example, the steps recited in any of the methods or process descriptions may be executed in any suitable order and are not limited to the order presented. Further, conventional mechanical and electrical aspects and elements of the individual operating components of the systems may not be described in detail. The representations of the various components are intended to represent exemplary functional relationships, positional relationships, and/or physical couplings between the various elements. Many alternative or additional functional relationships, physical relationships, optical relationships, or physical connections may be present in a practical system.

The present invention is described partly in terms of functional components and various methods. Such functional components may be realized by any number of components configured to perform the specified functions and achieve the various results. For example, the present invention may employ various isolation methods, connectors, and materials, such as metals, plastics, rubber, silicone, and the like, which may carry out a variety of functions. In addition, the present invention may be practiced in conjunction with any number of commercial and/or military applications and the system described is merely one exemplary application for the invention.

Figure 1:
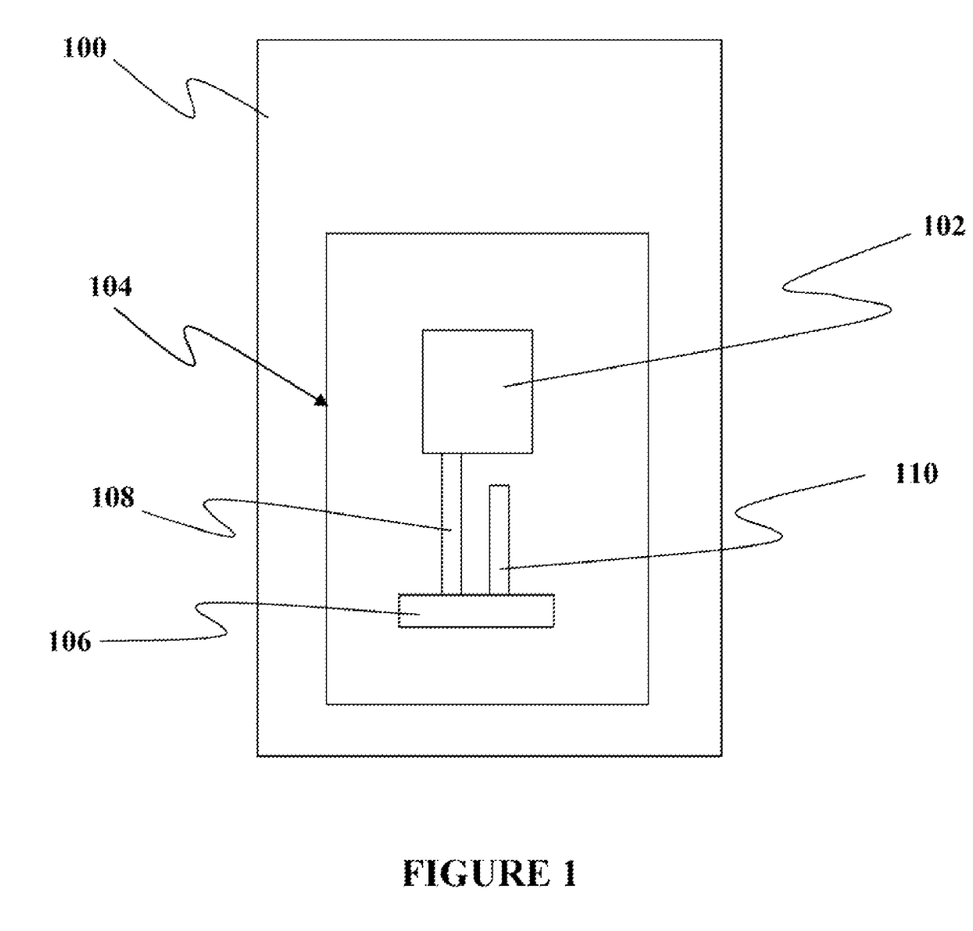
FIG. 1 representatively illustrates a vibration isolation system in accordance with an exemplary embodiment of the present invention.

Referring to FIG. 1, in one embodiment, methods and apparatus for reducing transmission of mechanical waves may operate in conjunction with a projectile 100, a body 102, and an isolation system 104. The projectile 100 may comprise any device that is launched at a target such as a missile, a guided artillery round, a penetrator, or an interceptor. In one embodiment, the projectile 100 may comprise a ballistically fired munition with a directional guidance system such as a guided munition launched from a 150-155 mm cannon. The projectile 100 may also be exposed to various forms of mechanically induced waves such as those resulting from initial launch and/or the extension of flight control surfaces. For example, flight control surfaces such as canards, rudders, elevators, and tail fins may be pyrotechnically deployed. Such deployment may cause a vibrational shock to the projectile 100 which, in turn, may be transferred to internal components such as a guidance system or other control systems.

The body 102 may comprise any component, device, system, or apparatus that is to be isolated from the mechanical waves imparted on or by the projectile 100. For example, the body 102 may comprise a system requiring isolation from vibration and shock such as a gyro, gimbals, a guidance system, a control system, or a surveillance system. The body 102 may also comprise an interface between the isolation system 104 and a piece of equipment requiring isolation from mechanical waves. For example, referring to FIGS. 6 and 7, in one embodiment, the body 102 comprises an aluminum adapter plate which is configured to couple an inertial measurement unit 602 to the isolation system 104.

The body 102 may be coupled to the isolation system 104 by any suitable method such as bolts, screws, adhesive, clamps, ties, welds, magnetic attraction, friction, compression fit, fasteners, or the like, or any combination thereof. Similarly, in an embodiment where the body 102 comprises an adapter plate, the body 102 may be coupled to the equipment to be isolated by any suitable method. The adapter plate may further comprise any suitable material given a particular use and environment such as metals, alloys, composites, ceramics, or a polymeric.

The isolation system 104 isolates the body 102 from mechanical waves which either originate with the projectile 100 or are transferred to the projectile 100 from another source. The isolation system 104 may comprise any suitable system for limiting the amount of vibration, shock, or other forces which are transferred to the body 102 during launch, directional guidance, deployment of control surfaces, or ejection of components attached to the projectile 100. The isolation system 104 may also be configured to be disposed either entirely or partially within the projectile 100. For example referring to FIG. 1, in one embodiment the isolation system 104 may be installed inside the projectile 100 and comprise a base 106, an isolator 108, and a first axial stop 110. The base 106 may be configured to connect or couple directly to an inner surface of the projectile 100 or alternatively to some internal structure of the projectile 100. The isolator 108 and the first axial stop 110 may be disposed between the base 106 and the body 102.

The base 106 is connected to the projectile 100 and engages the body 102. The base 106 may comprise any suitable system for securing the body 102 within the projectile 100 such as a mounting pad, a bulkhead, or an interface. The base 106 may also be configured in any shape or size and comprise any suitable material such as metal, ceramic, composite, or a polymer. For example, in the present embodiment, the base 106 comprises a circular shaped titanium mounting ring.

Figure 3:
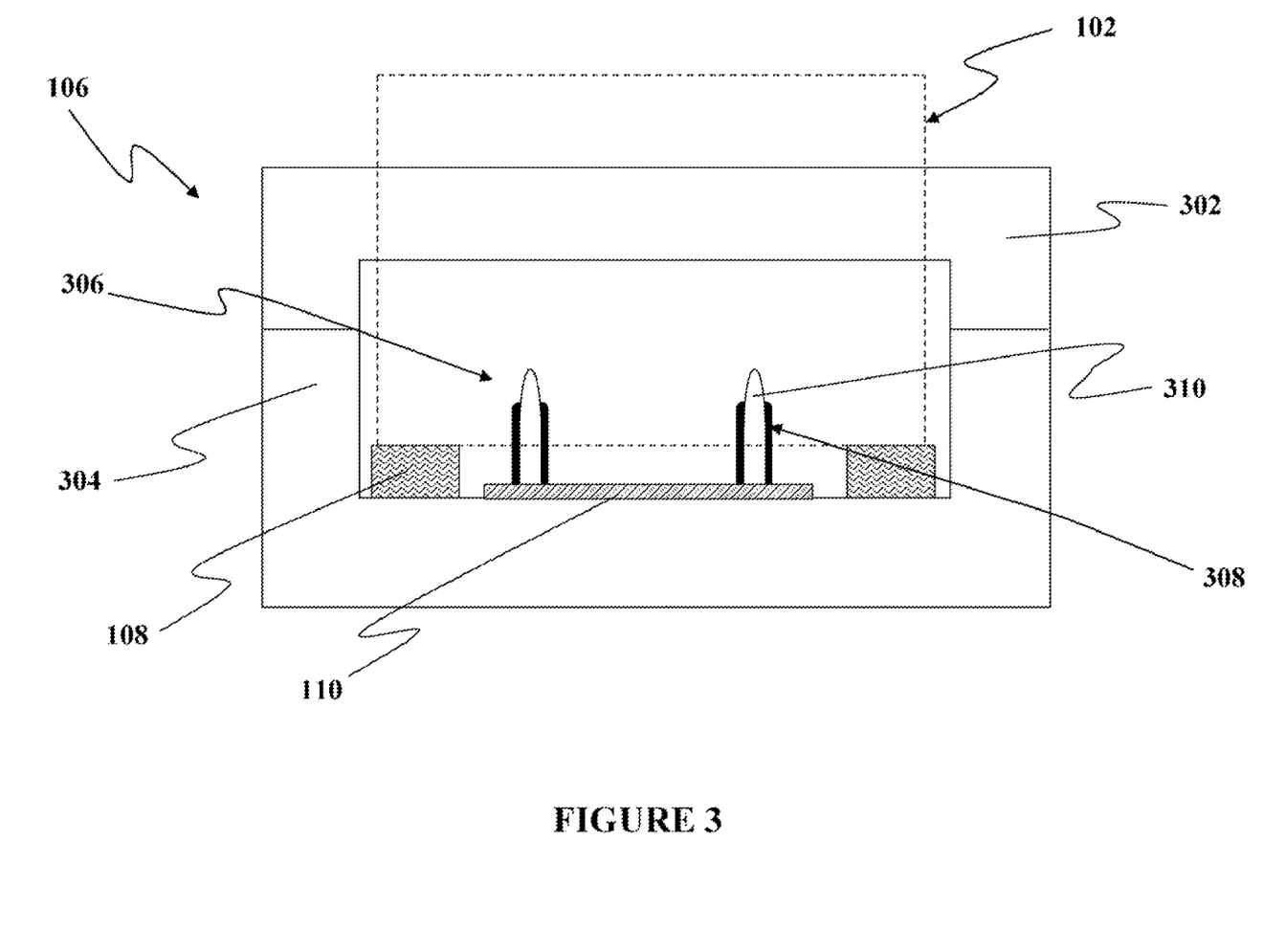
FIG. 3 representatively illustrates a cross-sectional view of the vibration isolation system.
Figure 7:
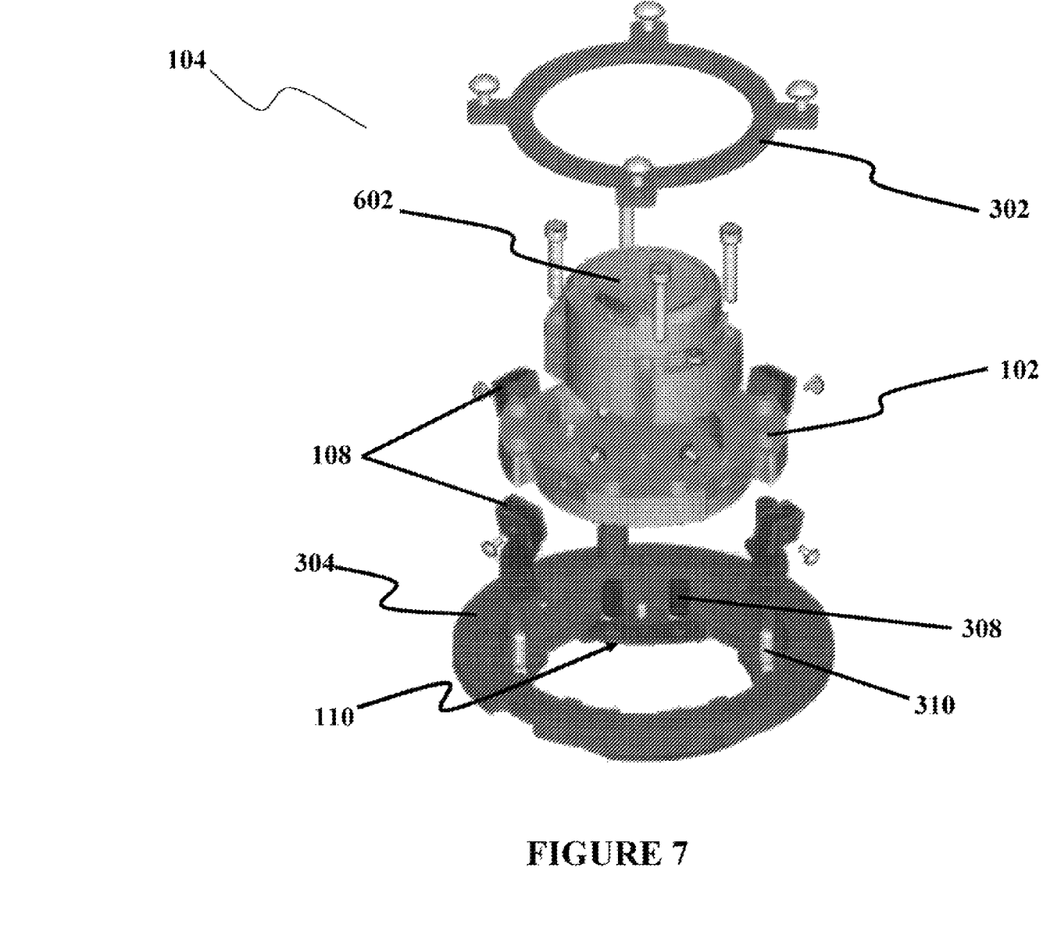
FIG. 7 representatively illustrates an exploded view of the vibration isolation system and a measurement unit.

The base 106 may further comprise one or more components. Referring now to FIGS. 3 and 7, in one embodiment for example, the base 106 comprises an upper base member 302 coupled to a lower base member 304. The lower base member 304 may further be connected to the isolator 108, the first axial stop 110, and a lateral stop 306. The lower base member 304 and the upper base member 302 may be coupled together by any suitable method such as with bolts, screws, clamps, a mating surface, or the like.

The isolator 108 decouples the body 102 from mechanical waves originating somewhere on or in the projectile 100. The isolator 108 may comprise any suitable method of reducing the transmission of forces or accelerations from one location to another. The isolator 108 may also comprise any suitable material with vibration inhibiting or similar properties such as polymers, elastomers, polyurethanes, gels, springs, bearings, and the like. The isolator 108 may also be suitably adapted to isolate particular frequencies of vibrations or a range of frequencies. In one embodiment it may be necessary to provide high frequency isolation to the body 102. In another embodiment it may be necessary to provide isolation among multiple ranges of frequencies while, for example, intermediate frequencies may not be of concern. The isolator 108 may also be configured in any suitable shape or size. For example, in one embodiment, the isolator 108 may comprise a silicone rubber pad configured in a substantially cuboid shape and adapted to provide a natural frequency above 180 Hz.

Figure 5:
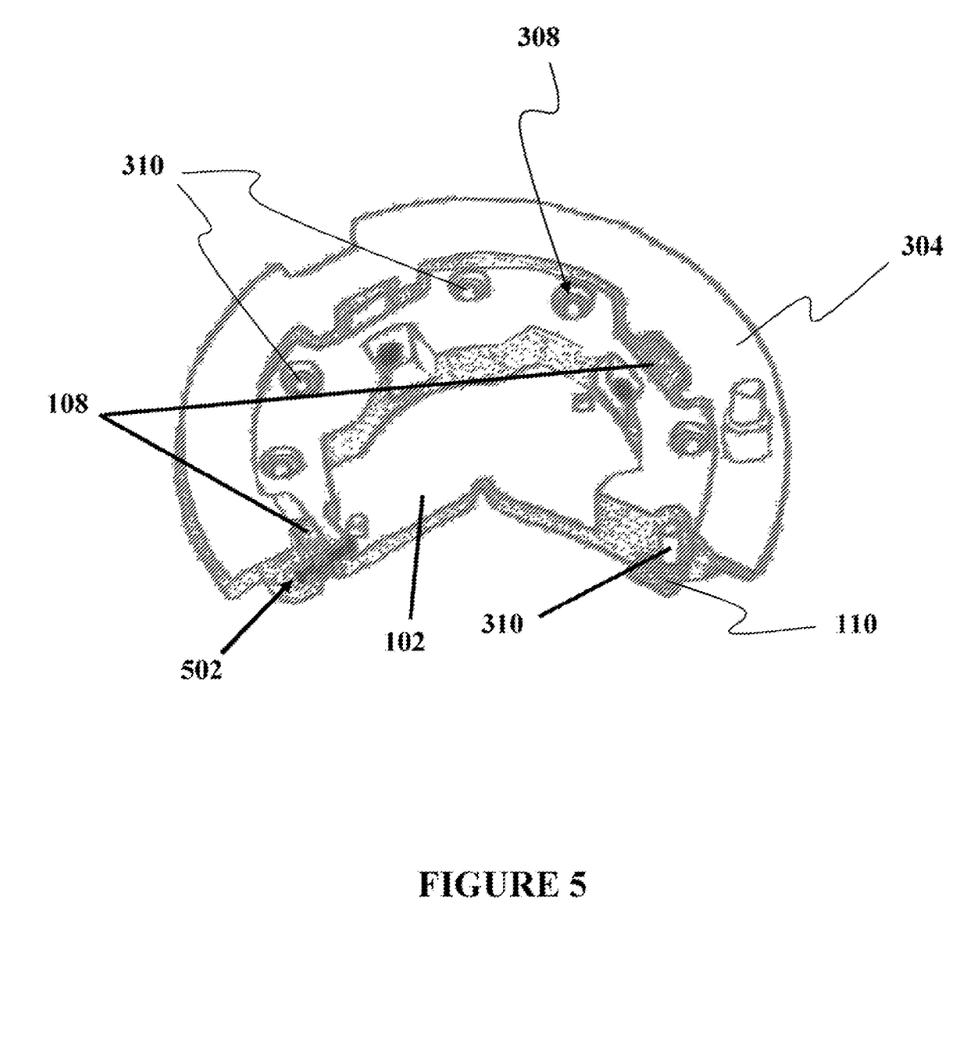
FIG. 5 representatively illustrates a cut-away, view of a lower base mount and an adapter plate.
Figure 6:
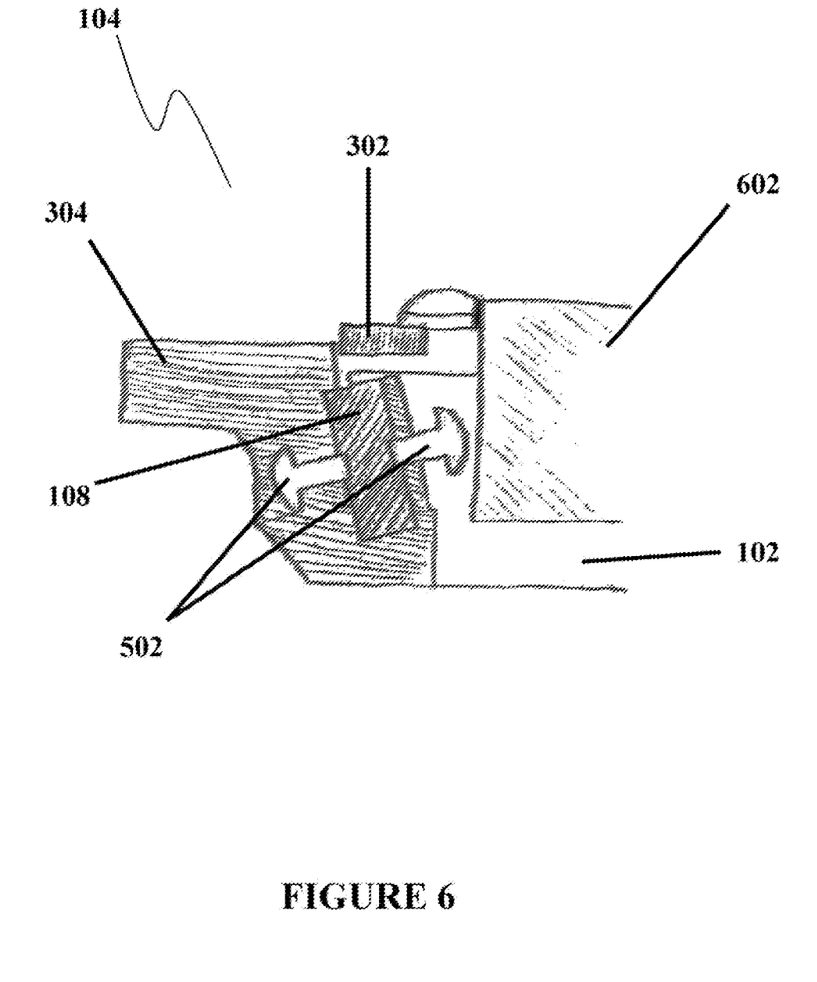
FIG. 6 representatively illustrates a cross-sectional view of an isolator interface.

The isolation system 104 may also comprise multiple isolators 108 configured to engage the body 102 in any suitable manner. For example, in one embodiment, four isolators 108 are located orthogonally about the lower base member 304 and suitably configured to completely support the body 102 during normal operational loading. The isolator 108 may also be configured to couple to the base 106 and body 102 in any suitable method such as with screws, bolts, adhesives, compression fit, and the like. Referring now to FIGS. 5 and 6 of the present embodiment, the isolator 108 is disposed between the lower base member 304 and the body 102 and held in place with a bolt 502.

Figure 2:
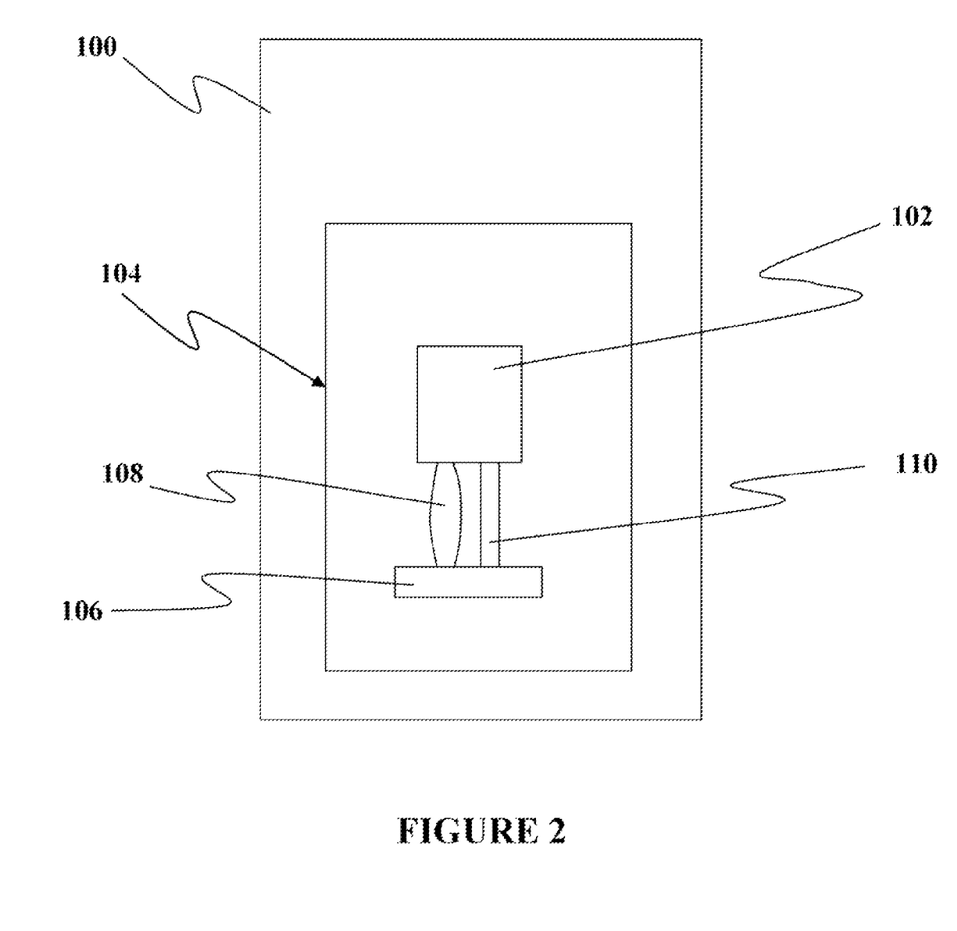
FIG. 2 representatively illustrates the vibration isolation system subjected to a displacement in response to an applied axial load.

The first axial stop 110 and the lateral stop 306 limit the amount of stress or strain that may be applied to the isolator 108. For example, during ballistic launch of the projectile 100, the body 102 may be subjected to an axial acceleration in access of 15,000 times the force of gravity. Referring again to FIG. 1, prior to launch and during projectile flight following a transient axial acceleration, the isolator 108 may support the body 102 isolating it from vibrations due to handling, loading, or flight conditions. Referring now to FIG. 2, during launch, axial accelerations placed on the body 102 may subject the isolator 108 to compressive, shear, and/or tensile forces causing deformation of the isolator 108. These forces may exceed the structural limitations of the isolator 108 and result in damage or destruction to the isolative properties of the isolator 108. The addition of the first axial stop 110 provides a secondary support structure for the body 102 during the transient launch phase when accelerative forces may be at their greatest level. The first axial stop 110 may be configured to provide additional support to the isolator or it may be configured as a hard stop physically limiting the amount of travel the body 102 may experience when subjected to an axial force above a predetermined level. For example, the first axial stop 110 may engage the body 102 thereby preventing direct contact between the body 102 and the lower base member 304 during the initial acceleration associated with a gun launched projectile 100.

Figure 4:
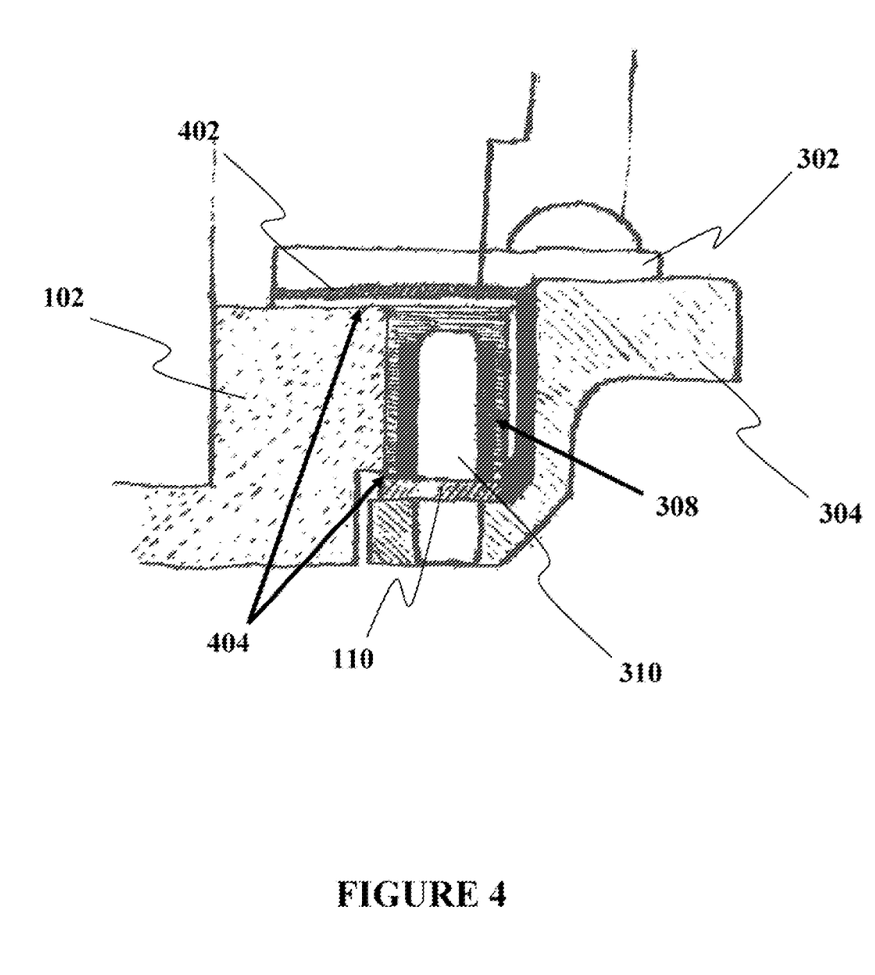
FIG. 4 representatively illustrates a cross-sectional view of an axial stop and a lateral stop.

Referring now to FIG. 4, the upper base member 302 may further comprise a second axial stop 402 which may be suitably configured to limit compressive, shear, and/or tensile forces applied to the isolator 108. The second axial stop 402 may also be configured to prevent direct contact between the body 102 and the upper base member 302. Additionally, a gap 404 may exist between the body 102 and both the first axial stop 110 and the second axial stop 402. The gap 404 may be configured to allow the isolator 108 to respond independently to forces beneath a threshold value. If the threshold value is exceeded then the body 102 may contact either of the axial stops before the isolator 108 is damaged. For example, in one embodiment, the gap 404 may provide a distance of 0.020 inches before the body 102 contacts either the first axial stop 110 or the second axial stop 402.

The first axial stop 110 and the second axial stop 402 may comprise any suitable material such as polymers, elastomers, gels, or a rigid material. The first axial stop 110 and the second axial stop 402 may also be configured in any suitable manner given a particular application or installation. For example, in one embodiment, the first axial stop 110 and the second axial stop 402 comprise a thermoplastic pad of low compressive modulus and about 0.060 and 0.100 inches in thickness.

Referring again to FIG. 3, the lateral stop 306 may similarly be used to provide additional support to the isolator 108 in response to forces that are not applied axially relative to the length of the projectile 100. The lateral stop 306 may comprise any suitable method for limiting the movement of the body 102 in a non-axial manner. The lateral stop 306 may further be configured to restrict movement of the body 102 in a lateral or radial direction while allowing movement in the axial direction. In one embodiment, the lateral stop 306 may be configured to withstand lateral accelerations in excess of 6,000 times the force of gravity. In another embodiment, the lateral stop 306 may only be subjected to forces less than 6,000 times the force of gravity.

The lateral stop 306 may comprise a single piece or be configured from multiple pieces. For example, referring to FIG. 3 of the present embodiment, the lateral stop 306 comprises a pin 310 and a sleeve 308 configured to prevent the body 102 from contacting the lower base member 304 during heavy lateral or radial loading.

The pin 310 is a rigid member used to prevent lateral or radial movement of the body 102 under loading. The pin 310 may comprise any suitable system for preventing unwanted movement of the body 102. The pin 310 may connect to the lower base member 304 by any suitable method such as bonded, welded, extruded, bolted, and the like. The pin 310 may comprise any suitable material such as metal, alloy, composite, ceramic, or may comprise a protrusion from the lower base member 304. Referring to FIGS. 5 and 7 of the present embodiment, there are eight dowel pins 310 extending from the surface of the lower base member 304 with two dowel pins 310 positioned between each isolator 108. In an alternative embodiment, there may be more or less than eight pins 310 or the pin 310 may be attached to the body 102 or the upper base member 302.

The sleeve 308 dampens the force applied to the pin 310 as a result of a force imparted to the base 106. The sleeve 308 may comprise any system for reducing the associated shock or vibration from an acceleration from the projectile 100. The sleeve 308 may comprise any suitable material such as polymers, elastomers, gels or the like. The sleeve 308 may be configured to be fit around the pin 310 or it may be integrated into the pin 310. For example, in the present embodiment, the sleeve 308 comprises a plastic sleeve that may be placed around the pin 310 before the body 102 is fit over the lower base member 304.

In operation, a projectile is fired at a target and a guidance system is used to increase the accuracy of the projectile. Following launch, a body 102, such as an inertial measurement unit (IMU), is subjected to an acceleration directed primarily along the length of the projectile. This acceleration tends to compress the IMU against an isolation system used to isolate the IMU from excessive vibration and shock.

The isolation system comprises a base 106, a series of isolators 108, and a series of stops. The stops comprise at least one axial stop 110 and at least one lateral stop 306 which are configured to prevent the body 102 from coming into direct contact with the base 106. The stops may comprise a series of semi-rigid materials with varying moduli which may be adapted to absorb or limit the amount of stress or strain applied to the isolators 108.

After the initial launch acceleration forces have past, the stops are no longer in direct contact with the body 102 and the isolators 108 completely support and substantially isolate the body from other transient forces. At some point during flight of the projectile 100 a series of pyrotechnic events may occur in which flight control surfaces may be deployed or pieces of the projectile 100 are ejected from the surface of the projectile 100. These pyrotechnic events may cause vibrations or oscillations in the projectile which the isolators 108 are suitably adapted to limit transmission of to the body 102.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An apparatus for isolating a vibration sensitive device located inside of a projectile from a mechanical wave imparted on the projectile, comprising:
    a base having a lower base member and an upper base member, wherein:
        the lower base member is configured to connect to an inner portion of the projectile; and
        the upper base member connects to the lower base member;
    an adapter plate coupled between the lower base member and the upper base member, wherein the adapter plate is configured to attach to the vibration sensitive device;
    an isolator disposed between the lower base member and the adapter plate, wherein the isolator is adapted to inhibit transmission of the mechanical wave from the projectile to the vibration sensitive device;
    an axial stop connected to the lower base member, wherein the axial stop is configured to limit a compressive force applied to the isolator; and
    a lateral stop connected to the lower base member, wherein the lateral stop is configured to limit at least one of a lateral force, and a torsional force applied to the isolator in response to the mechanical wave.

2. An apparatus according to claim 1, further comprising a second axial stop connected to the upper base member, wherein the second axial stop is configured to limit a tensile force applied to the isolator.

3. An apparatus according to claim 2, wherein the isolator is further configured to prevent the adapter plate from contacting the first and second axial stops in the absence of an axial load greater than a predetermined value.

4. An apparatus according to claim 1, wherein isolator comprises a polymer having a first compressive modulus.

5. An apparatus according to claim 3, wherein the first and second axial stops comprises a polymer pad having a different compressive modulus than the isolator.

6. An apparatus according to claim 1, wherein the lateral stop comprises:
    a pin configured to inhibit a displacement of the isolator in response to a non-axial force imparted to the lower base member; and
    a sleeve disposed between the pin and the adapter plate and adapted to dampen the force applied to the pin.

7. An apparatus according to claim 1, wherein the apparatus is configured to withstand at least one of an acceleration in excess of 15,000 g in a substantially axial direction and an acceleration in excess of 6,000 g in a substantially lateral direction.

8. An apparatus according to claim 1, wherein the isolator is configured to substantially isolate the body from the effects of vibrations above 180 Hz.

9. A method for isolating a body inside of a projectile from effects a mechanical wave imparted on the projectile, comprising:
    attaching an isolator to a base connected to an inner portion of the projectile, wherein the isolator is configured to substantially inhibit transmission of the mechanical wave to the body;
    attaching a stop to the base, wherein the stop is configured to limit at least one of a compressive force, a tensile force, a lateral force, and a torsional force applied to the isolator in response to the mechanical wave;
    attaching a pin to the base, wherein the pin is configured to limit at least one of a lateral force and a torsional force applied to the isolator in response to the mechanical wave; and
    coupling the body to the base such that the isolator is disposed between the body and the base.

10. A method for isolating a body according to claim 9, further comprising connecting the body to a vibration sensitive device.

11. A method for isolating a body according to claim 9, wherein the stop comprises at least one of:
    an axial stop suitably configured to substantially inhibit at least one of compression, elongation, and deformation of the isolator in a substantially axial direction;
    a radial stop suitably configured to substantially inhibit at least one of compression, elongation, and deformation of the isolator in a substantially radial direction; and
    a lateral stop suitably configured to substantially inhibit at least one of compression, elongation, and deformation of the isolator in a substantially lateral direction.

* * * * *